(12) United States Patent
Liu et al.

(10) Patent No.: US 9,894,134 B2
(45) Date of Patent: Feb. 13, 2018

(54) METHOD AND DEVICE FOR OBTAINING NETWORK FEEDBACK

(71) Applicant: Samsung Electronics Co., Ltd., Suwon-si, Gyeonggi-do (KR)

(72) Inventors: Weimin Liu, Beijing (CN); Qingli Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 14/244,207

(22) Filed: Apr. 3, 2014

(65) Prior Publication Data

US 2014/0310376 A1 Oct. 16, 2014

(30) Foreign Application Priority Data

Apr. 16, 2013 (CN) .......................... 2013 1 0131773

(51) Int. Cl.
*H04L 29/08* (2006.01)
*G06Q 10/10* (2012.01)
*G06Q 50/00* (2012.01)

(52) U.S. Cl.
CPC ............. *H04L 67/02* (2013.01); *G06Q 10/10* (2013.01); *H04L 67/22* (2013.01); *G06Q 50/01* (2013.01)

(58) Field of Classification Search
CPC ......... H04L 67/02; H04L 67/22; G06Q 10/10; G06Q 50/01
See application file for complete search history.

(56) References Cited

U.S. PATENT DOCUMENTS

| | | | |
|---|---|---|---|
| 8,560,954 B1* | 10/2013 | Nakajima | G06Q 50/01 715/753 |
| 8,666,984 B2* | 3/2014 | Kim | G06F 17/2785 707/737 |
| 8,867,849 B1* | 10/2014 | Kirkham | G06F 17/30268 382/224 |
| 8,885,960 B2* | 11/2014 | Sauve | G06F 17/30038 382/244 |
| 9,146,656 B1* | 9/2015 | Srinivasan | G06F 3/0482 |
| 2006/0271688 A1* | 11/2006 | Viger | H04L 63/101 709/227 |
| 2009/0326986 A1* | 12/2009 | Crucs | G06F 19/321 705/3 |
| 2010/0131878 A1* | 5/2010 | Fujioka | A63F 13/12 715/765 |
| 2011/0154223 A1 | 6/2011 | Whitnah et al. | |

(Continued)

FOREIGN PATENT DOCUMENTS

JP 2013-164650 A 8/2013
KR 2011-0136308 A 12/2011

*Primary Examiner* — Uzma Alam
(74) *Attorney, Agent, or Firm* — Jefferson IP Law, LLP

(57) ABSTRACT

A method for obtaining network feedback is provided by a terminal. The method includes sending data information, publishing, by the terminal, the data information to a website, establishing a correspondence relationship between the data information and the published data information, accessing the website on which the data information is published, and obtaining feedback information to the data information, processing the data information and the feedback information, and informing a user of an updating status of the feedback information. The embodiment of the present disclosure further provides a terminal device for obtaining the network feedback.

16 Claims, 13 Drawing Sheets

(56) References Cited

U.S. PATENT DOCUMENTS

| | | | |
|---|---|---|---|
| 2011/0178981 A1 | 7/2011 | Bowen et al. | |
| 2011/0218931 A1* | 9/2011 | Logan | G06Q 50/01 |
| | | | 705/319 |
| 2011/0258556 A1 | 10/2011 | Kiciman et al. | |
| 2012/0041946 A1* | 2/2012 | Oka | G06F 17/30268 |
| | | | 707/722 |
| 2012/0060105 A1* | 3/2012 | Brown | H04L 51/24 |
| | | | 715/753 |
| 2012/0144311 A1 | 6/2012 | Yeh et al. | |
| 2012/0151383 A1 | 6/2012 | Kazan et al. | |
| 2013/0007665 A1* | 1/2013 | Chaudhri | G06F 9/4443 |
| | | | 715/830 |

* cited by examiner

FIG. 4

| photo | state | account | sharing platform | time | object | information number |
|---|---|---|---|---|---|---|
| photo P1 | unshared | | | | | |
| photo P2 | shared | account z2 | QQ zone | 2012-11-20 11:09 | friend | information number X |
| photo P3 | shared | shared z3 | Sina microblogs | 2012-11-19 10:29 | friend | information number Y |
| photo P3 | shared | shared z4 | Renren photo album | 2012-11-19 10:29 | Li Ming Zhao Peng | information number Z |

Comments (3)

XXXXX
XXXXXXXXXXXXXXXXXX
XXXXXXXXXXXXXXXXXX
XXXXXXXXXXXX
2012-11-20 10:21

XXXXX
XXXXXXXXXXXXXXXXXX
XXXXXXXXXXXXXXXXXX
XXXXXXXXXXXX
2012-11-19 10:00

XXXXX
XXXXXXXXXXXXXXXXXX
XXXXXXXXXXXXXXXXXX
XXXXXXXXXXXX
2012-11-18 11:00 from: Sina microblogs (2)

XXXXX
XXXXXXXXXXXXXXX
XXXXXXXXXXXXXXX
XXXXXXXXXXXX
2012-11-20 10:21

XXXXX
XXXXXXXXXXXXXXX
XXXXXXXXXXXXXXX
XXXXXXXXXXXX
2012-11-18 10:00 from: Renren photo album (1)

XXXXX
XXXXXXXXXXXXXXX
XXXXXXXXXXXXXXX
XXXXXXXXXXXX
2012-11-19 10:00

METHOD AND DEVICE FOR OBTAINING NETWORK FEEDBACK

CROSS-REFERENCE TO RELATED APPLICATION(S)

This application claims the benefit under 35 U.S.C. § 119(a) of a Chinese patent application filed on Apr. 16, 2013 in the Chinese Intellectual Property Office and assigned Serial number 201310131773.9, the entire disclosure of which is hereby incorporated by reference.

TECHNICAL FIELD

The present disclosure relates to the technical field of terminal devices. More particularly, the present disclosure relates to a method and device for obtaining network feedback.

BACKGROUND

Recently, with the rapid development of the electronic industry and communication technology, new services based on data, voice and video are rapidly developing. The rapid development of micro-electronics technology and computer software and hardware technology lays the foundation for processing increasingly complex operations by the terminal device, and allows for the individualization of the terminal device to ensure that the terminal is free from the restrictions of a network to a certain extent and may have increasingly powerful functions. In addition, the user may also have pressing needs on the terminals, and hopes that the functions of the terminals are more powerful, flexible and convenient. Due to the development of information technology, the trend in the advancement of terminal technology is toward intelligence, mobilization and multi-functionalization.

For example, with the improvement of photographing and network functions of the terminal, the user performs photographing and shares photos in the terminal photo album to social networks such as various network platforms of microblogs, Renren, Facebook and the like by using the terminal with increasing frequency.

In the case of the related-art terminal technology and functions, the terminal user logs in to a social platform to see corresponding information to view comment information or add information of internet users to the photos. For example, a mobile phone photo album is separated from comment information of social contact friends, and thus the user cannot immediately see the comments of the friends when browsing the mobile phone photo album, and only sees the comments of the friends by logging in to the social platform. In addition, the user also needs to respectively login in to different social platforms to respectively check comments of friends in different platforms when sharing the photos to different social platforms, and cannot perform this activity in multiple platforms at once.

Therefore, it is desired to provide a corresponding technical scheme for addressing the shortcomings of the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for addressing at least one of the above technical defects, particularly, when the user publishes data information in a terminal on the internet, the terminal records information of the internet, and then, the terminal obtains feedback information of users in the internet to the data information through communication with the internet, and displays an updating condition and a content aggregation of the feedback information in a plurality of internet websites in the terminal.

In order to address the above purposes, on the one hand, an embodiment of the present disclosure provides a method for obtaining the network feedback is provided by the terminal. The method includes sending, data information, publishing the data information to a website, establishing a correspondence relationship between the data information and the published data information, accessing the website on which the data information is published, and obtaining feedback information to the data information, processing the data information and the feedback information, and informing a user of an updating status of the feedback information.

On the other hand, an embodiment of the present disclosure provides a terminal device. The terminal device comprises a sending module configured to send data information, to publish the data information to a website, and to establish a correspondence relationship between the data information and the published data information, a receiving module configured to access the website on which the data information is published, and to obtain feedback information to the data information, and a data processing module configured to process the data information and the feedback information, and to inform the user of the updating status of the feedback information.

According to the above method for reminding receiving information, or terminal device disclosed by the present disclosure, no additional hardware is needed to be added in a terminal, when the user uploads data information in the terminal to the website, a terminal user may immediately and conveniently browse feedback information of users on the website to the data information. Therefore, the terminal user does not need to log in to multiple websites for consulting corresponding information, and thus the operation of the user to the terminal is simplified and the experience of the user is increased.

Other aspects, advantages, and salient features of the disclosure will become apparent to those skilled in the art from the following description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4 is a schematic diagram of aggregation display of data information and feedback information thereof according to the embodiment of an present disclosure;

Throughout the drawings, it should be noted that like reference numbers are used to depict the same or similar elements, features, and structures.

DETAILED DESCRIPTION

Figure 1:
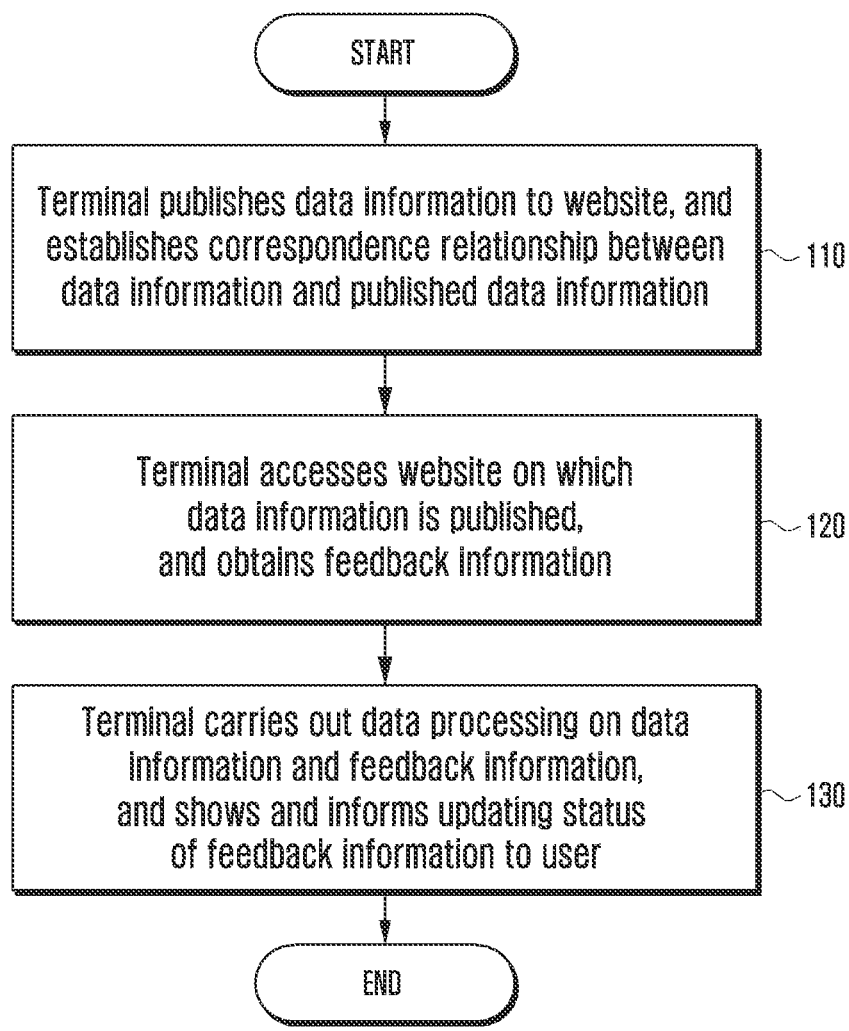
FIG. 1 is a flow diagram of a method for obtaining network feedback according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", "the", and "the" include plural referents unless the context clearly indicates otherwise. Thus, for example, reference to "a component surface" includes reference to one or more of such surfaces.

Unless otherwise defined, all terms (including technical and scientific terms) used herein have the same meaning as commonly understood by one of ordinary skill in the art to which the present disclosure belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

Those skilled in the art will understand that the term "terminal" used herein encompasses not only devices with a wireless signal receiver having no emission capability but also devices with receiving and emitting hardware capable of carrying out bidirectional communication over the two-way communication link. This kind of devices may include a cellular or other communication device with or without a multi-line display; a Personal Communication System (PCS) with combined functionalities of voice and data processing, facsimile and/or data communication capability; may include a Personal Digital Assistant (PDA) having a Radio Frequency (RF) receiver and an internet network/intranet access, a web browser, a notepad, a calendar and/or a Global Positioning System (GPS) receiver; and/or a conventional laptop and/or palm computer or other devices having a RF receiver. The "mobile terminal" used herein may refer to a portable, a transportable, a fixed on a transportation (e.g., aviation, maritime and/or terrestrial) or suitable for and/or configured to run locally and/or run in the form of distribution on the earth and/or other places. The "mobile terminal" used herein may also refer to a communication terminal, an Internet network terminal, a music/video player terminal. The "mobile terminal" used herein may also refer to a PDA, Mobile Information Device (MID), and/or mobile phone with music/video playback capabilities, etc.

An embodiment of the present disclosure provides a method for obtaining network feedback, comprising the following three operations.

First, a terminal sends data information, publishes the data information to a website, and establishes a correspondence relationship between the data information and the published data information.

Second, the terminal accesses the website on which the data information is published, and obtains feedback information to the data information.

Third, the terminal carries out data processing on the data information and the feedback information, and informs a user of a status of updating the feedback information.

FIG. 1 is a flow diagram of a method for obtaining network feedback according to an embodiment of the present disclosure.

Referring to FIG. 1, the method for obtaining the network feedback comprises the operations 110-130.

In operation 110, the terminal publishes data information on a website, and establishes a correspondence relationship between the data information and the published data information.

More specifically, the data information comprises data of any one or more of a photo, a video, music, a character, and the like.

In a specific application, the data information is published on the internet, particularly, the data information of the photo, the video, the music, the character and other forms is uploaded to social platforms such as microblogs, Renren, QQ zone, post bar, a Bulletin Board System (BBS), and Facebook.

More specifically, publishing the data information to the website comprises the terminal publishing data information to one or more websites in a specific catalogue or specific position, and establishing an association relationship between the data information and feedback information. For example, the terminal stores data information in a specific catalogue or specific position, publishes data in one internet website, or publishes data on a plurality of internet websites. More specifically, the data may only be published in Renren, and also published in Renren, microblogs, QQ zone, and other social platforms.

In addition, when the data information in one terminal is cut, copied or pasted to another terminal, the correspondence relationship established by the terminal between the data information and the published data information is also cut, copied or pasted along with the corresponding data information. For example, the published data information is specifically embodied in a website content IDentifier (ID) on a network. For instance, a user uploads one photo on the Renren network through a mobile phone, the mobile phone establishes a correspondence relationship between the photo and a Renren network account, when the photo is cut and copied to a tablet personal computer, the correspondence relationship is cut and copied to the tablet personal computer together with the photo, and if the tablet personal computer also has the function of the present disclosure, the tablet personal computer also realizes synchronization of the comment information of the photo and the Renren network by using the correspondence relationship.

In operation 120, the terminal accesses the website on which the data information is published and obtains feedback information to the data information.

More specifically, accessing the website on which the data information is published by the terminal comprises the terminal accessing the website on which the data information is published at a specific time interval; or when the user views the data information, the terminal accessing the website on which the data information is published. For example, the terminal accesses microblogs once at intervals of 5 minutes; and for example, when the user browses the photo uploaded in the mobile phone photo album, the mobile phone accesses the Renren network on which the photos are published to obtain comments and the like of friends for the photos.

In a specific application, accessing the website on which the data information is published and obtaining and/or displaying feedback information by the terminal when the user views the data information can be realized through the one of an operating mode 1 and an operating mode 2.

Figure 2:
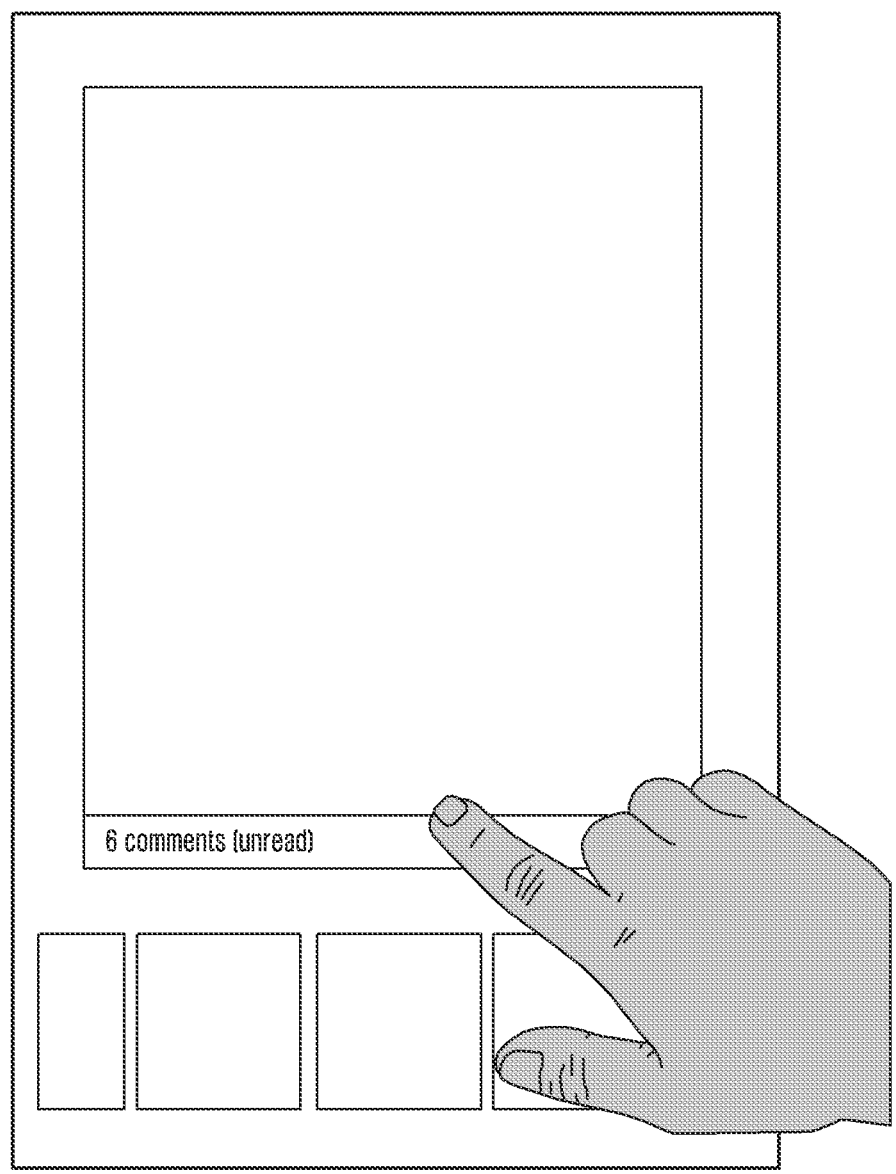
FIG. 2 is a schematic diagram of executing a specific operating mode 1 by a user according to an embodiment of the present disclosure.

An example of operating mode 1 is shown in FIG. 2.

FIG. 2 is a schematic diagram of executing a specific operating mode 1 by a user according to an embodiment of the present disclosure.

Referring to FIG. 2, operating mode 1 includes, in a photo browsing interface of the mobile phone photo album, clicking reminding information below a photo, and triggering to enter a comment information reading interface.

Figure 3:
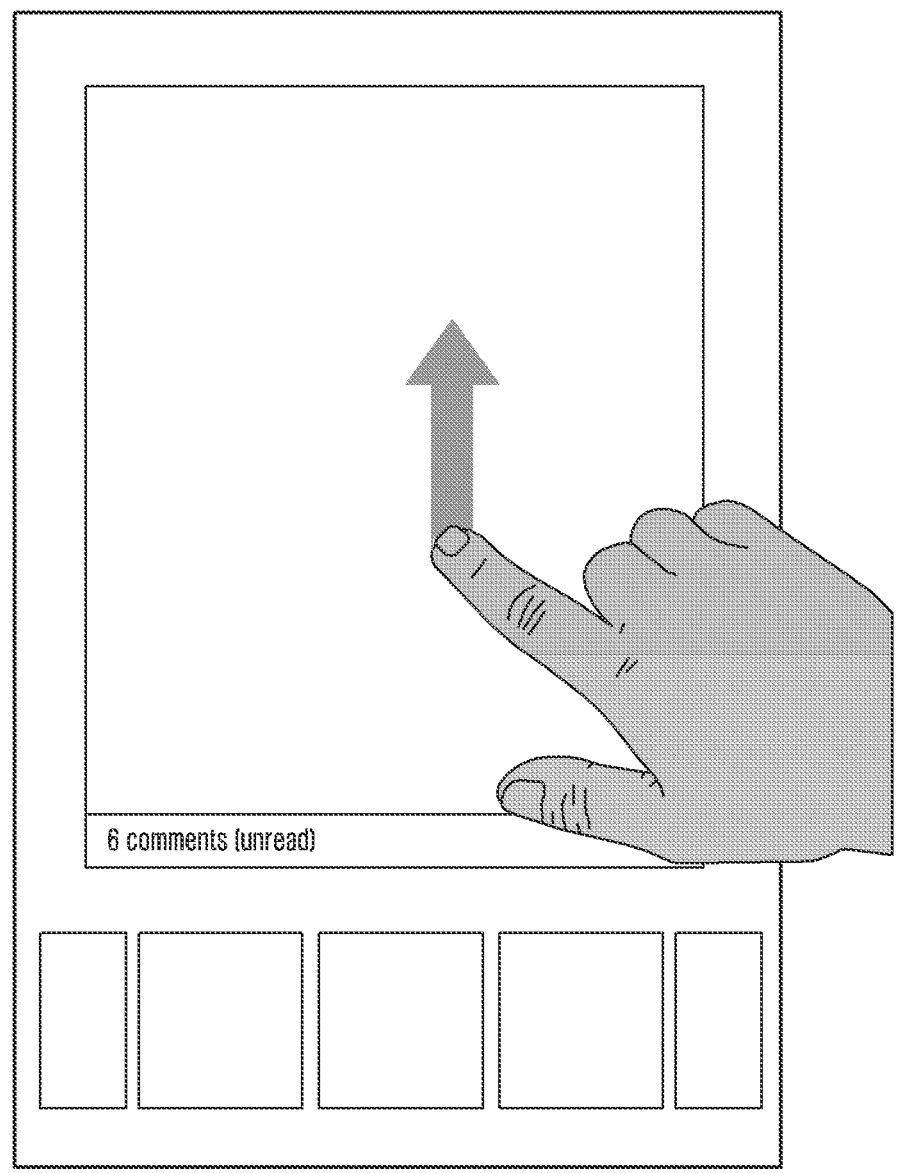
FIG. 3 is a schematic diagram of executing a specific operating mode 2 by the user according to an embodiment of the present disclosure.

An example of operating mode 2 is shown in FIG. 3.

FIG. 3 is a schematic diagram of executing a specific operating mode 2 by the user according to an embodiment of the present disclosure.

Referring to FIG. 3, operating mode 2 includes, in the photo browsing interface of the mobile phone photo album, upwards sliding on the photo by using a finger, and triggering to enter the comment information reading interface.

In addition, in the case of supporting active pushing of comment information by a social platform, the social platform can be used for actively pushing comment information corresponding to the photo to the terminal. The terminal updates the comment content when receiving information pushed by the social platform.

More specifically, the obtaining of feedback information to data information comprises the terminal detecting and downloading new emerging feedback information; or the terminal detecting and counting the new emerging feedback information.

More specifically, the obtaining of the feedback information to data information comprises the terminal obtaining the feedback information of users on one or more websites to the data information according to a specific catalogue or specific position.

Figure 5:
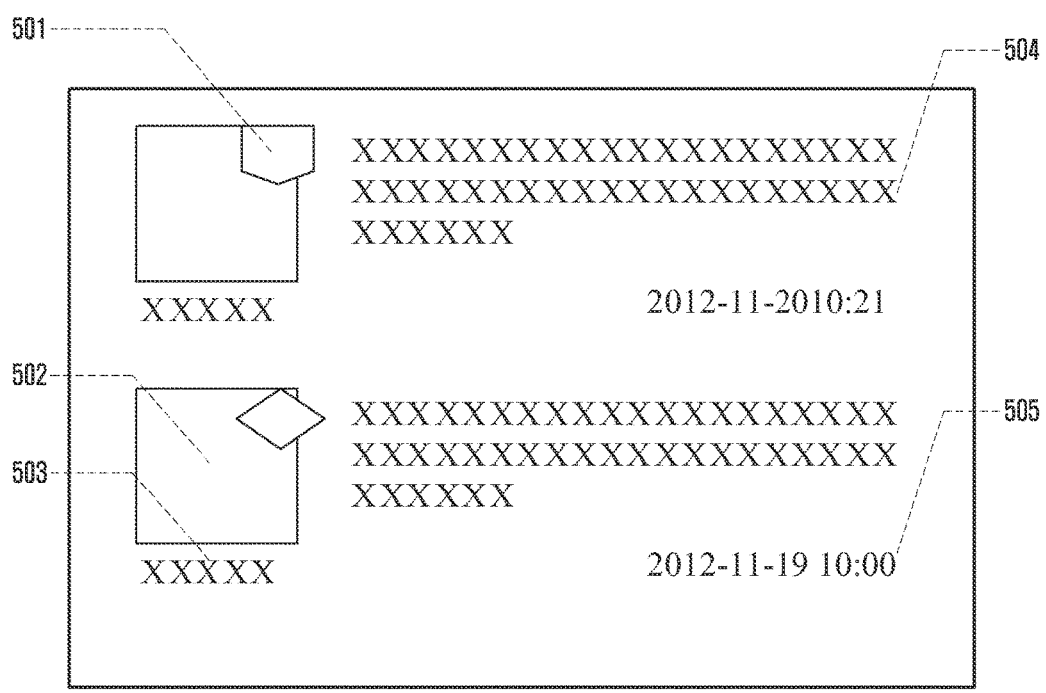
FIG. 5 is a schematic diagram of aggregation display of data information and feedback information thereof according to a certain rule according to the embodiment of an present disclosure.

For example, the terminal can merge and store comment information obtained from different social platform channels according to a uniform content format as shown in FIG. 5.

FIG. 5 is a schematic diagram of aggregation display of data information and feedback information thereof according to a certain rule according to the embodiment of an present disclosure.

Referring to FIG. 5, reference sign 501 represents a content source of comments, e.g., a social platform, reference sign 502 represents a friend head portrait, reference sign 503 represents a friend name, reference sign 504 represents a comment content, reference sign 505 represents comment publishing time, and if the same one photo corresponding to a plurality of pieces of comment information, the plurality of pieces of comment information are aggregated to the photo according to a certain rule.

More specifically, modes for aggregating data information and feedback information thereof may comprise aggregating mode 1 and aggregating mode 2.

Figure 6:
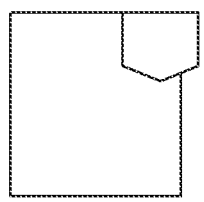
FIG. 6 is a schematic diagram of an aggregation mode 1 of data information and feedback information thereof according to an embodiment of the present disclosure.
Figure 6:
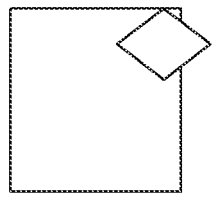
Figure 6:
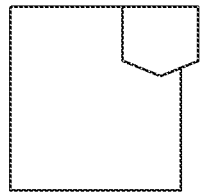

An example of aggregating mode 1 in which aggregating is performed according to the publishing time of the comment information is shown in FIG. 6.

FIG. 6 is a schematic diagram of an aggregation mode 1 of data information and feedback information thereof according to an embodiment of the present disclosure.

Referring to FIG. 6, aggregating mode 1 includes placing recently updated comment contents at the top, sequentially arranging the recently updated comment contents according to the time sequence, and indicating sources of comments.

Figure 7:
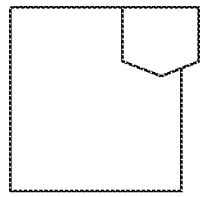
FIG. 7 is a schematic diagram of an aggregation mode 2 of data information and feedback information thereof according to an embodiment of the present disclosure.
Figure 7:
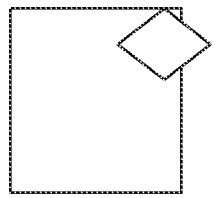
Figure 7:
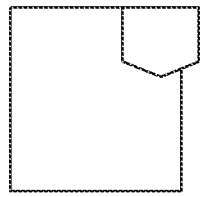

An example of aggregating mode 2 in which aggregating is performed according to comments from different social platforms is shown in FIG. 7.

FIG. 7 is a schematic diagram of an aggregation mode 2 of data information and feedback information thereof according to an embodiment of the present disclosure.

Referring to FIG. 7, aggregating mode 2 includes aggregating comments from the same social platform together, and arranging multiple comments in the same social platform according to the time sequence.

More specifically, feedback information of data information comprises status information of the data information and comment information of the data information.

Wherein, the status information of the data information comprises reading status information of the data information and sharing status information of the data information, for example, browsing times of the photo to friends on social websites, sharing times of characters to the friends on the social websites and the like.

Returning back to FIG. 1, in operation 130 the terminal carries out data processing on the data information and the feedback information and shows and informs an updating status of the feedback information to the user.

More specifically, carrying out data processing on the data information and the feedback information by the terminal comprises the terminal sequencing the feedback information according to the source and the publishing time; and the terminal recording the sequenced feedback information by using the data information as an index so as to achieve the effect of aggregating the data information and the feedback information thereof, as shown in FIG. 4.

FIG. 4 is a schematic diagram of aggregation display of data information and feedback information thereof according to the embodiment of an present disclosure.

In addition, carrying out data processing on the data information and the feedback information by the terminal comprises the terminal carrying out corresponding feedback on the feedback information to the data information according to a specific catalogue or specific position and publishes the corresponding feedback on one or more websites according to the correspondence relationship between the data information and a website ID in which the data information is published. For example, the user uploads one photo on Sina microblogs through a mobile phone, the mobile phone establishes a correspondence relationship between the photo and the Sina microblogs. If some friends comment on the photo, the user may directly reply to the comments about the photo in the mobile phone, and the terminal also carries out the same reply on the comments in Sina microblogs according to the correspondence relationship between the photo and the Sina microblogs. Therefore, the effect of synchronizing the mobile phone and the Sina microblogs is achieved.

More specifically, informing the user of the updating status of the feedback information comprises the terminal reminding the updating status of the feedback information through a voice or character by using the data information as the index. For example, the terminal may inform the user of updating the feedback information through one of a feedback information updating mode 1, a feedback information updating mode 2, and a feedback information updating mode 3.

Figure 8:
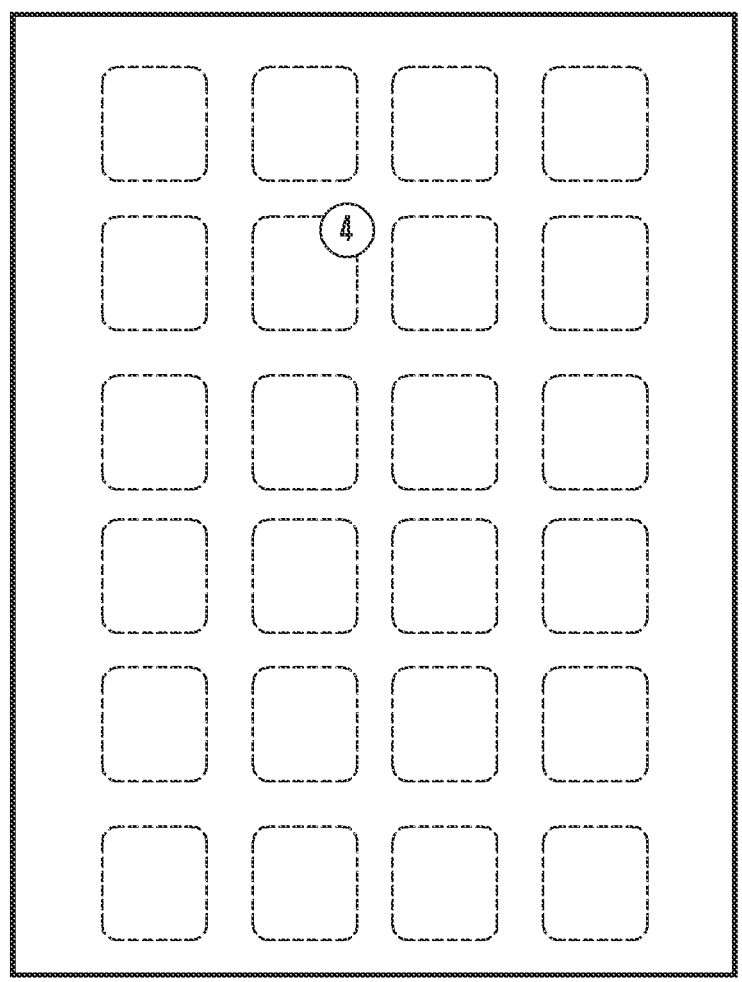
FIG. 8 is a schematic diagram of informing the user of updating a feedback information mode 1 by the terminal according to an embodiment of the present disclosure.

An example of the feedback information updating mode 1 is shown in FIG. 8.

FIG. 8 is a schematic diagram of informing the user of updating a feedback information mode 1 by the terminal according to an embodiment of the present disclosure.

Referring to FIG. 8, the feedback information updating mode 1 includes reminding the user through a reminding function of a mobile phone when new contents generate in comment information corresponding to a mobile phone photo album. As shown in FIG. 8, the common reminding mode is that a photo album program icon on a main interface of the mobile phone displays a total number of updated comments.

Figure 9:
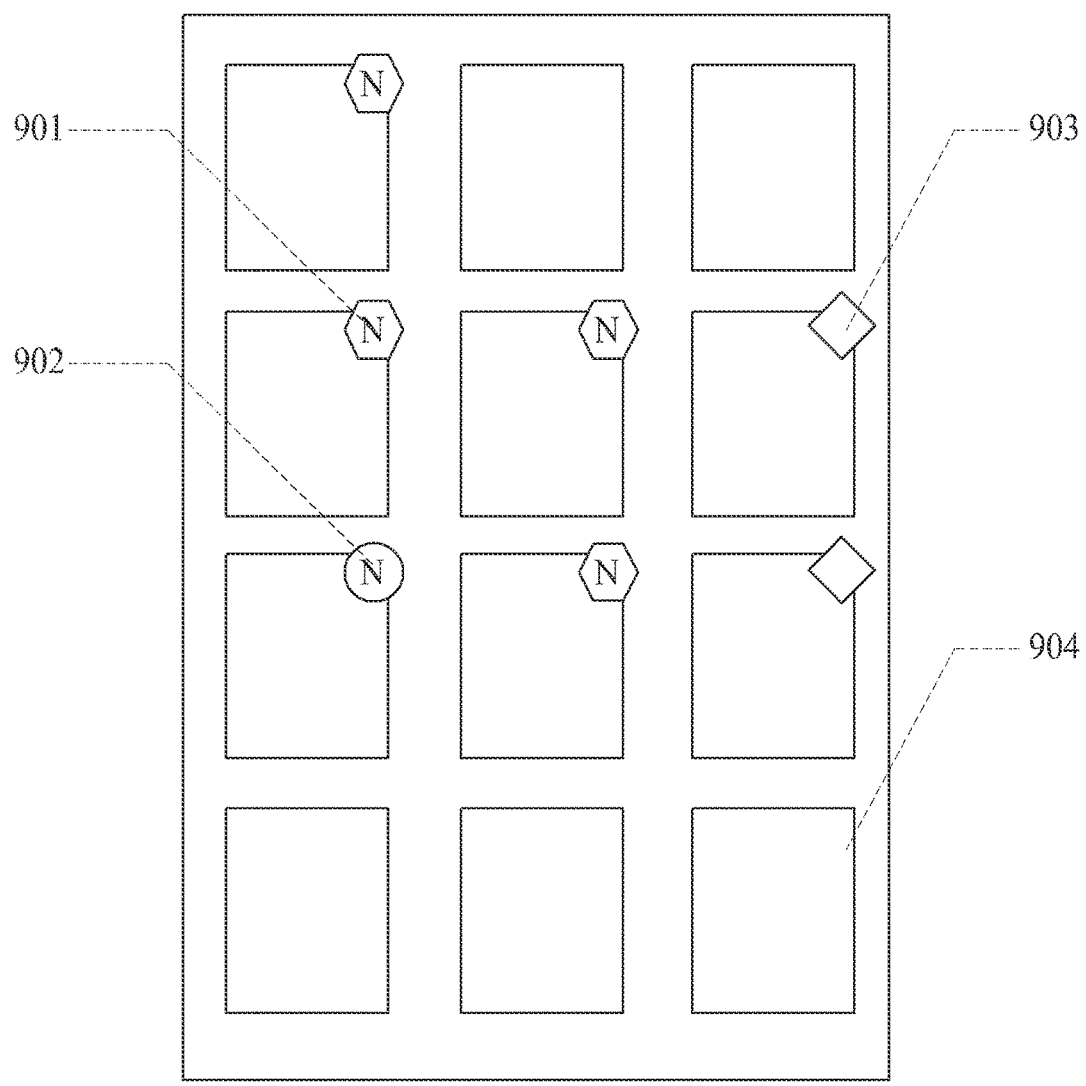
FIG. 9 is a schematic diagram of informing the user of updating a feedback information mode 2 by the terminal according to an embodiment of the present disclosure.

An example of the feedback information updating mode 2 is shown in FIG. 9.

FIG. 9 is a schematic diagram of informing the user of updating a feedback information mode 2 by the terminal according to an embodiment of the present disclosure.

Referring to FIG. 9, the feedback information updating mode 2 includes, when the user opens the mobile phone photo album, entering a thumbnail browsing interface, and reminding the user of the sharing condition of the photo and the updating and reading condition of the comment information through different icons and interfaces. The user is reminded of the sharing condition of the photo and the updating and reading condition of the comment information through different icons and interfaces. Reference sign 901 represents that the photo has been shared to a social platform and there are N comments in the social platform, and contents of the comments have not been read by a user. Reference sign 902 represents that the photo has been shared and there are N relevant comments in the social platform, the comments have been read by the user and no updated comments are generated at present. Reference sign 903 represents that the photo has been shared but there are no contents of friend comments temporarily. Reference sign 904 represents a common thumbnail effect of the photo, wherein the photo has not been shared.

Figure 10:
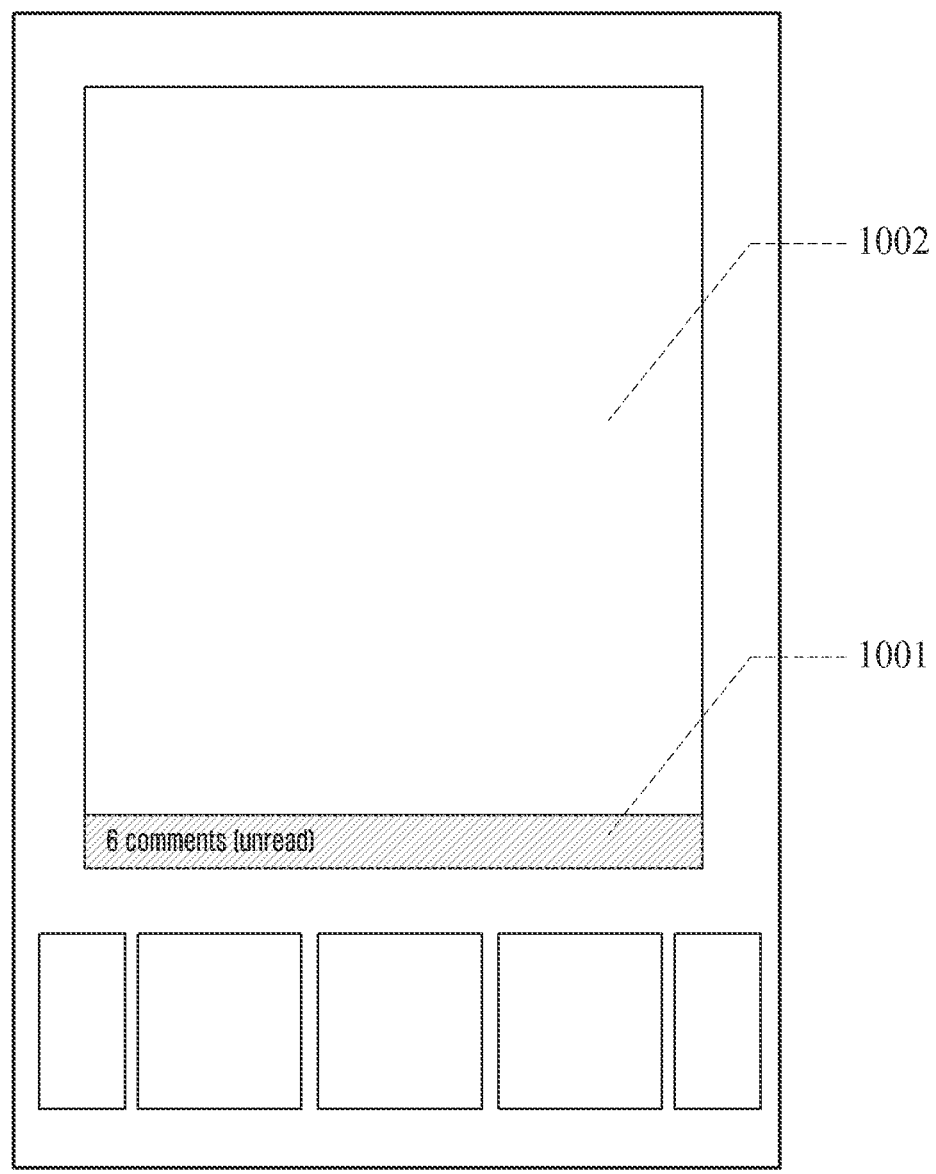
FIG. 10 is a schematic diagram of informing the user of updating a feedback information mode 3 by the terminal according to an embodiment of the present disclosure.

An example of the feedback information updating mode 3 is shown in FIG. 10.

FIG. 10 is a schematic diagram of informing the user of updating a feedback information mode 3 by the terminal according to an embodiment of the present disclosure.

Referring to FIG. 10, the feedback information updating mode 3 includes, when the user browses some photo, reminding a comment updating condition of the photo. As shown in FIG. 10, reference sign 1001 shows reminding information, which comprises a number of comments of the photo and reminds whether the comments have been read or not, and reference sign 1002 is a currently browsed photo.

As an embodiment of the present disclosure, the specific catalogue or specific position mentioned in the present disclosure comprises, but is not limited to, a storage position of the data information in the terminal. For example, an associating relationship is established between the feedback information and the storage position, the user may publish information and receive feedback information through a catalogue in which the data information is of the terminal. The user may also obtain and read the feedback information in the position, and further reply to and publish the feedback information in the position. That is, the terminal associates a display position of the feedback information with the storage position of the data information so that the user may view and reply with relevant feedback information when browsing the data information.

Through the above modes, the user can obtain comment information, sharing information, updating condition and other feedback information of users in websites in a plurality of social platforms to data uploaded by the user in the specific catalogue or specific position, and thus the operation of the user to the terminal is simplified and the experience of the user is increased.

The displaying of the feedback information by the terminal can be realized through one of mode 1 and mode 2.

Figure 11:
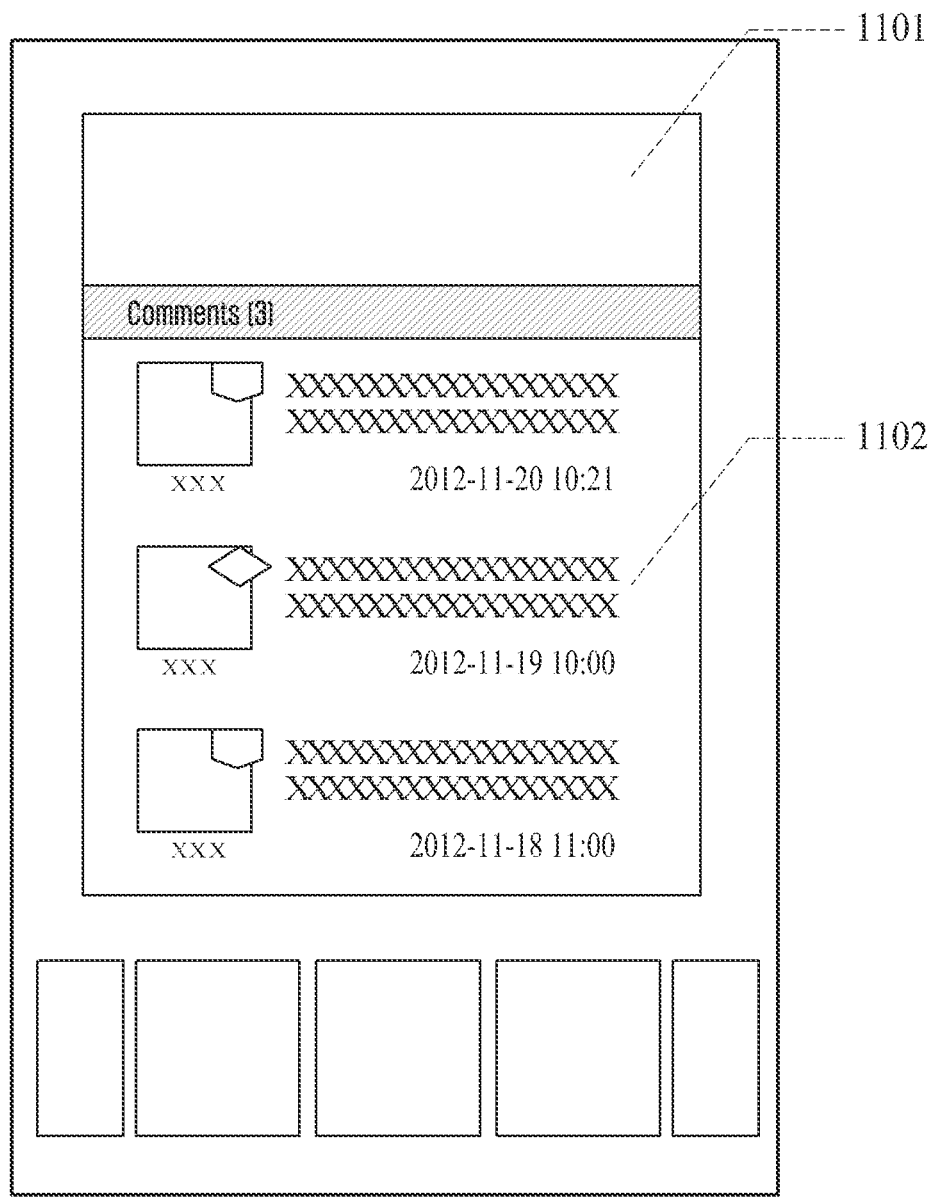
FIG. 11 is a schematic diagram of displaying a feedback information mode 1 by the terminal according to an embodiment of the present disclosure.

An example of mode 1 is shown in FIG. 11.

FIG. 11 is a schematic diagram of displaying a feedback information mode 1 by the terminal according to an embodiment of the present disclosure.

Referring to FIG. 11, the photo is moved upwards, and contents of comments are shown below the photo. Reference sign 1101 is a part that remains after the photo is moved upwards, and reference sign 1102 shows the contents of the comments corresponding to the photo.

Figure 12:
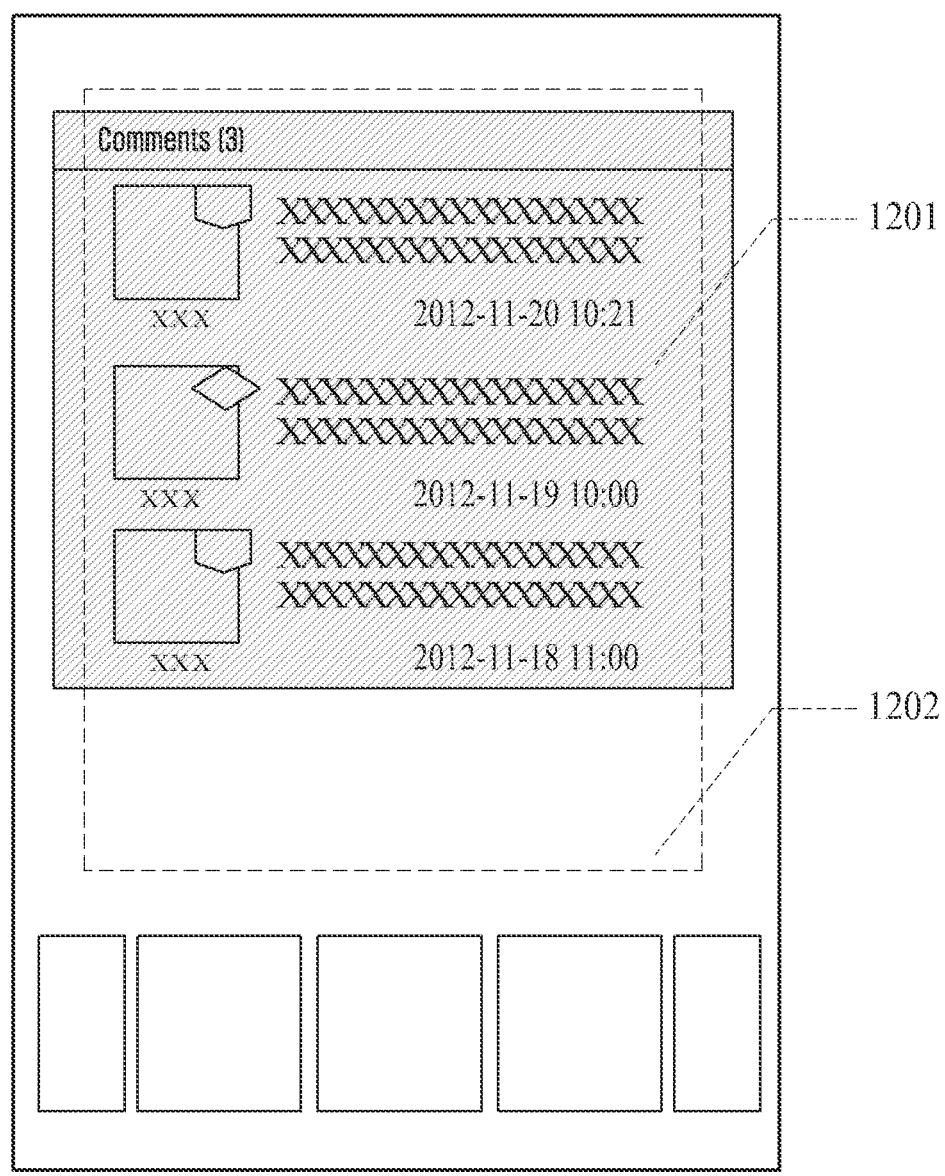
FIG. 12 is a schematic diagram of displaying a feedback information mode 2 by the terminal according to an embodiment of the present disclosure.

An example of mode 2 is shown in FIG. 12.

FIG. 12 is a schematic diagram of displaying a feedback information mode 2 by the terminal according to an embodiment of the present disclosure.

Referring to FIG. 12, a semi-transparent layer 1201 is set below the contents of the comments, the contents of the comments and the semi-transparent layer 1201 are displayed above the photo 1202 in a hover layer mode, and the color of the photo 1202 becomes lighter or the image is blurred.

Figure 13:
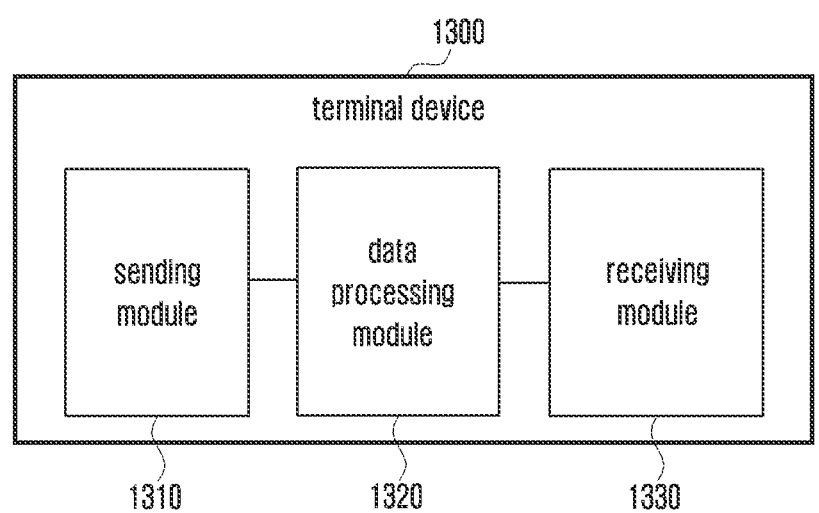
FIG. 13 is a structure schematic diagram of a terminal device according to an embodiment of the present disclosure.

FIG. 13 is a structure schematic diagram of a terminal device according to an embodiment of the present disclosure.

Referring to FIG. 13, on the other hand, an embodiment of the present disclosure further provides a terminal device 1300, which comprises a sending module 1310, a data processing module 1320 and a receiving module 1330.

The sending module 1310 is used for sending data information, publishing data information to a website, and establishing a correspondence relationship between the data information and the published data information.

The receiving module 1330 is used for accessing the website on which the data information is published, and obtaining feedback information to the data information.

The data processing module 1320 is used for carrying out data processing on the data information and the feedback information and informing a user of an updating status of the feedback information.

More specifically, the sending module 1310 is further used for publishing data information on one or more websites in a specific catalogue or specific position, and the data processing module 1320 is further used for establishing an association relationship between the data information and the feedback information.

More specifically, the receiving module 1330 is further used for obtaining feedback information of users on one or more websites to the data information in the specific catalogue or specific position.

More specifically, the data processing module 1320 is used for carrying out corresponding feedback on the feedback information to the data information in the specific catalogue or specific position according to the correspondence relationship between the data information and the published data information, and the sending module 1310 is used for publishing the corresponding feedback on one or more websites.

More specifically, the data processing module 1320 is further used for selecting the specific catalogue or specific position as a storage position of the data information in the terminal; and the receiving module 1330 is further used for obtaining and/or displaying the feedback information in the storage position.

For example, the data processing module 1320 establishes the association relationship between the feedback information and the storage position, the user may publish information and receive the feedback information in a catalogue in which the data information is through a terminal device 100, and then obtains and reads the feedback information in the storage position, and further replies and publishes the feedback information in the storage position. That is, the terminal device 100 associates a display position of the feedback information with the storage position of the data information so that the user checks and replies the relevant feedback information when browsing the data information.

More specifically, the data information published by the sending module 1310 comprises, but is not limited to, data of one or more of a photo, a video, music, and a character.

More specifically, the feedback information obtained by the receiving module 1330 may comprise status information of the data information and/or comment information of the data information.

The status information may comprise reading status information of the data information and/or sharing status information of the data information.

More specifically, the receiving module 1330 is further used for accessing the website on which the data information is published at a specific time interval; or the receiving module 1330 is further used for accessing the website on which the data information is published when the user views the data information.

More specifically, the receiving module 1330 is further used for detecting and downloading emerging feedback information; or the receiving module 1330 is further used for detecting and counting the emerging feedback information.

More specifically, the data processing module 1320 is further used for sequencing the feedback information according to the source and the publishing time; and the data processing module 1320 is further used for recording the sequenced feedback information by using the data information as an index.

More specifically, the data processing module 1320 is further used for reminding an updating status of the feedback information through a voice or character form by using the data information as the index.

The examples of the above terminal device 100 only explain typical schemes of the method disclosed by the present disclosure, obviously, other methods disclosed above are also suitable for being realized by the terminal device 100, and corresponding contents are not repeated herein.

Furthermore, the embodiment of the present disclosure further discloses a portable electronic photo album which comprises a sending unit, a receiving unit and a data processing unit.

More specifically, the sending unit is used for sending an electronic photo to bring the convenience for publishing the photo on the website by the user, and establishing a correspondence relationship between the local photo in the electronic photo album and the photo published on the website.

The receiving unit is used for accessing the website on which the photo is published, and obtaining feedback information to the photo.

The data processing unit is used for carrying out data processing on the photo and the feedback information, and informing the user of an updating status of the feedback information.

As a specific application of the electronic photo album, the sending unit is further used for publishing the photo to one or more websites in the specific catalogue or specific position, and the data processing unit is further used for establishing an associating relationship between the photo and the feedback information.

Furthermore, the receiving unit is used for obtaining feedback information of users on one or more websites to the photo in the specific catalogue or specific position.

In addition, the data processing unit is further used for carrying out corresponding feedback on the feedback information of the photo in the specific catalogue or specific position according to the correspondence relationship between the local photo in the electronic photo album and the published photo, and the sending unit is further used for publishing the corresponding feedback on one or more websites.

As an embodiment of the electronic photo album, the data processing unit is further used for selecting the specific catalogue or specific position as the storage position of the photo in the electronic photo album; and the receiving unit is further used for obtaining and/or displaying feedback information in the storage position.

According to the above scheme, a plurality of photos may be simultaneously stored in the electronic photo album, and can be directly published on a website platform through the electronic photo album when needed to be published. For example, after the electronic photo album pre-obtains user names and passwords of a plurality of network platforms, the photos can be published in a plurality of social platforms such as Renren network, microblogs and QQ zone. The correspondence relationship between the local photos and the photos published in the network has been established, therefore, it is absolutely clear to learn the names of the photos published, the published places, the published statuses etc., as shown in FIG. 7. The user may receive feedback of users in the network to the photos in the electronic photo album and further replies to the feedback through the electronic photo album. Similarly, the feedback information and replying information can be managed by using the corresponding photos as the index, as shown in FIG. 8 and FIG. 9, so as to be conveniently viewed by the user.

More specifically, the feedback information obtained by the receiving unit comprises status information of the photos and/or comment information of the photos.

The status information obtained by the receiving unit comprises reading status information of the photos and/or sharing status information of the photos.

To facilitate the use of the user, the receiving unit may be set to access the website on which the photos are published at a specific time interval; or when the user views the photos in the electronic photo album, to access the website on which the photos are published.

Afterwards, the receiving unit is further used for detecting and downloading emerging feedback information; or the receiving unit is further used for detecting and counting the emerging feedback information.

In addition, the data processing unit is further used for sequencing the feedback information according to the source and the publishing time; and the data processing unit is further used for recording the sequenced feedback information by using the photos as the index.

The data processing unit is further used for reminding an updating status of the feedback information through a voice or character form by using the photos as the index.

The electronic photo album disclosed by the present disclosure may directly run in various terminal devices, and also may run in a network server, and provide a function of managing the electronic photos to the user.

According to the above modes, the user may obtain comment information, sharing information, updating condition, and other feedback information of users in websites of a plurality of social platforms to the data uploaded by the user, and thus the operation of the user to the terminal is simplified, and the experience of the user is increased.

The method, terminal device or electronic photo album for recording a call record, disclosed by the present disclosure, has one or more of the following advantages that the user uploads the data information in the terminal to the internet without adding additional hardware in the terminal, and the terminal user may immediately and conveniently browse the feedback information of users in the internet to the data information. Therefore, the terminal user may check the corresponding information without logging in a plurality of internets, and thus the operation of the user to the terminal is simplified and the experience of the user is increased.

A person skilled in the art can understand that the present disclosure may involve devices for carrying out one or more of the operations described in the present application. The devices can be specially designed and manufactured as required, or can include well known equipment in a general-purpose computer which stores programs that are selectively activated or reconstructed. Computer programs as such can be stored in a non-transitory device (such as computer) readable media or in any type of medium suitable for storing electronic signaling and respectively coupled to a bus, the non-transitory computer readable medium includes, but is not limited to, any type of disk (including floppy disk, hard disk, optical disk, CD-ROM, and magneto optical disk), Random Access Memory (RAM), Read Only Memory (ROM), electrically programmable ROM, Electrically Erasable ROM (EEROM), Electrically Erasable Programmable ROM (EEPROM), flash memory, magnetic card or optical line card.

It should be understood by a person skilled in the art that computer program instructions can be used to realize these structural diagrams and/or each block in block diagrams and/or flow charts as well as a combination of these structural diagrams and/or blocks in the block diagrams and/or flow diagrams. These computer program instructions can be provided to general purpose computers, special purpose computers or other processors of programmable data processing means to produce a machine, so that the instructions are executed by the computers or the processors of programmable data processing means to create a designated method for effecting the structural diagram and/or a block or blocks of block diagrams and/or flow diagrams.

A person skilled in the art can understand that the operations, the methods, the operations in the flows, the measures, the schemes discussed in the present disclosure can be replaced, changed, combined or deleted. Further, the operations, the methods, the other steps in the flows, the measures, the schemes discussed in the present disclosure can also be replaced, changed, rearranged, combined or deleted. Further, prior arts having the operations, the methods, the other steps in the flows, the measures, the schemes discussed in the present disclosure can also be replaced, changed, rearranged, combined or deleted.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for obtaining network feedback by a terminal, the method comprising:

sending data information corresponding to contents to at least two social platforms;

receiving at least one feedback information from the at least two social platforms, the at least one feedback information being associated with the contents sent to the at least two social platforms;

establishing an association relationship between a storage position of the contents and the at least one feedback information published on the at least two social platforms;

generating each of image item corresponding to the at least one feedback information; and outputting an aggregated image item comprising the contents and the generated each of image item to access the at least one feedback information published on the at least two social platforms based on the established association relationship, the aggregated image item being outputted in an overlapped manner on the user interface corresponding to the contents, wherein the each of image item is displayed as one of a plurality of display types of image items determined according to a sharing condition of the contents and a reading condition of the at least one feedback information, wherein the sending of the data information to the at least two social platforms comprises sending the data information from one of a specific catalog or a specific position to the at least two social platforms in the one of the specific catalogue or the specific position, wherein the one of the specific catalogue or the specific position, is a storage position of the data information in the terminal, and wherein the terminal displays the at least one feedback information in the storage position.

2. The method according to claim 1, wherein the receiving of the at least one feedback information associated with the data information comprises:

obtaining the at least one feedback information of users on the at least two social platforms to the respective data information in the one of the specific catalogue and the specific position.

3. The method according to claim 1, further comprising: transmitting, when the data information is transmitted to an external device, a correspondence relationship between the user interface and the data information.

4. The method according to claim 1, wherein the data information comprises data of one or more of a photo, a video, music, or a character.

5. The method according to claim 1, wherein association of the at least one feedback information to the data information is based on status information of at least one of the data information or comment information of the data information.

6. The method according to claim 5, wherein the status information comprises at least one of reading status information of the data information or sharing status information of the data information.

7. The method according to claim 1, wherein the outputting of the aggregated image item comprises:

outputting the aggregated image item comprising the contents and the generated each of image item in a time sequence manner arranged based on a received time of the at least one feedback information from each of the at least two social platforms.

8. The method according to claim 1, wherein the receiving of the at least one feedback information associated with the data information comprises one of:

detecting and downloading new emerging feedback information; or detecting the new emerging feedback information and counting the new emerging feedback information.

9. The method according to claim 1, wherein the outputting of the aggregated image item comprises:

sequencing the at least one feedback information according to a source and a publishing time of the at least one feedback information; and recording the feedback information by using the data information as an index.

10. The method according to claim 9, wherein the outputting of the aggregated image item comprises:

displaying a reminder of an updating status of the at least one feedback information through at least one of a voice or a character form by using the data information as an index.

11. A terminal device comprising:

a storage configured to store instructions therein;

a transceiver; and at least one processor, wherein, upon execution of the instructions, the at least one processor is configured to:

send data information corresponding to contents to at least two social platforms, receive at least one feedback information from the at least two social platforms, the at least one feedback information being associated with the contents sent to the at least two social platforms, establish an association relationship between a storage position of the contents and the at least one feedback information published on the at least two social platforms, generate each of image item corresponding to the at least one feedback information, and output an aggregated image item comprising the contents and the generated each of image item to access the at least one feedback information published on the at least two social platforms based on the established association relationship, the aggregated image item being outputted in an overlapped manner on the user interface corresponding to the contents, wherein the each of image item is displayed as one of a plurality of display types of image items determined according to a sharing condition of the contents and a reading condition of the at least one feedback information, wherein the sending of the data information to the at least two social platforms comprises sending the data information from one of a specific catalog or a specific position to the at least two social platforms in the one of the specific catalogue or the specific position, wherein the one of the specific catalogue or the specific position, is a storage position of the data information in the terminal, and wherein the terminal displays the at least one feedback information in the storage position.

12. The terminal device according to claim 11, wherein the at least one processor is further configured to transmit, when data information transmits to an external device, a correspondence relationship between the user interface and the data information.

13. The terminal device according to claim 11, wherein the transceiver is configured to output the aggregated image item in a time sequence manner arranged based on a received time of the at least one feedback information from each of the at least two social platforms.

14. The terminal device according to claim 11, wherein the data information published by the at least one processor comprises data of one or more of a photo, a video, music, or a character.

15. The terminal device according to claim 11, wherein the at least one feedback information obtained by the transceiver comprises status information of at least one of the data information or comment information of the data information.

16. The terminal device according to claim 15, wherein the status information obtained by the transceiver comprises at least one of reading status information of the data information or sharing status information of the data information.

* * * * *